(12) United States Patent
Lee et al.

(10) Patent No.: US 7,650,235 B2
(45) Date of Patent: Jan. 19, 2010

(54) TELEMATICS SYSTEM USING IMAGE DATA AND METHOD FOR DIRECTING A ROUTE BY USING THE SAME

(75) Inventors: Eun-Hee Lee, Gwangmyeong-si (KR); Yong-Khon Moon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 673 days.

(21) Appl. No.: 10/933,764

(22) Filed: Sep. 3, 2004

(65) Prior Publication Data

US 2005/0119826 A1    Jun. 2, 2005

(30) Foreign Application Priority Data

Nov. 28, 2003    (KR) .................... 10-2003-0085566

(51) Int. Cl.
*G08G 1/123* (2006.01)

(52) U.S. Cl. ................... 701/209; 342/357.09

(58) Field of Classification Search ............... 701/202, 701/205, 208–210; 340/995.19, 995.12, 340/995.14, 988, 990; 342/357.09
See application file for complete search history.

(56) References Cited

U.S. PATENT DOCUMENTS

| 6,107,944 | A | 8/2000 | Behr et al. |
| 6,314,295 | B1 * | 11/2001 | Kawamoto ............... 455/456.2 |
| 6,397,145 | B1 * | 5/2002 | Millington .................. 701/211 |
| 6,763,301 | B2 * | 7/2004 | McDonough ............... 701/208 |
| 6,889,134 | B2 * | 5/2005 | Nakane et al. .............. 701/202 |
| 6,993,350 | B2 * | 1/2006 | Katoh ........................ 455/457 |
| 7,054,746 | B2 * | 5/2006 | Kodani et al. ............... 701/212 |
| 7,062,375 | B2 * | 6/2006 | Hatano ....................... 701/207 |

FOREIGN PATENT DOCUMENTS

GB    2 337 653    11/1999

* cited by examiner

*Primary Examiner*—Dalena Tran
(74) *Attorney, Agent, or Firm*—The Farrell Law Firm, LLP

(57) ABSTRACT

Disclosed is a telematics system comprising a telematics terminal for storing complex intersection images and providing information related to a present position and a running direction by using the complex intersection images, and a telematics server for sharing ID codes of the complex intersection images stored in the telematics terminal with the telematics terminal and creating route data in response to a request from the telematics terminal, wherein the telematics server adds the ID codes of the complex intersection images to the route data when the route data include complex intersections and transmits the ID codes of the complex intersection images and the route data to the telematics terminal. The telematics system provides route information, which is easily recognized by users.

16 Claims, 7 Drawing Sheets

| TRANSMISSION POSITION | DATA PROPERTY | CONTENTS |
|---|---|---|
| AROUND INTERSECTION (ENLARGED VIEW) | IMAGE | |
| | STRING | HANNAM IC(JAM-SIL) |
| | NUMBER | 500, 1,3.5,17:00 |
| | Code | O, ↑ ↑, ROADCOED |

FIG.4

| OVERPASS | BASIC PATTERN |  | ADDITIONAL PATTERN |  |
|---|---|---|---|---|
| UNDERPASS | BASIC PATTERN |  | ADDITIONAL PATTERN |  |
| P TURN | BASIC PATTERN |  | ADDITIONAL PATTERN | |
| DIAMOND TYPE | BASIC PATTERN |  | ADDITIONAL PATTERN | | ary
TELEMATICS SYSTEM USING IMAGE DATA AND METHOD FOR DIRECTING A ROUTE BY USING THE SAME

PRIORITY

This application claims priority to an application entitled "Telematics System Using Image Data And Method For Guiding Route By Using The Same" filed in the Korean Intellectual Property Office on Nov. 28, 2003 and assigned Serial No. 2003-85566, the contents of which are incorporated herein by reference.

BACKGROUND OF THE INVENTION

1. Field of the Invention

The present invention relates to a telematics system, and more particularly to a telematics system using intersection image data and a method for efficiently directing a route by using the same.

2. Description of the Related Art

Telematics is a compound word of "telecommunication" and "informatics." Telematics is a technique for providing a mobile communication service and a position tracking service to a vehicle so as to provide a driver with real time information relating to vehicle accidents, vehicle burglaries, driving routes, traffic and other driving conditions, as well as games.

Such a telematics system mainly provides services to a user who is in motion, so the telematics system includes a predetermined terminal installed on a vehicle. The terminal installed on the vehicle for the telematics system is called a "telematics terminal." The telematics terminal may include a communication function for conducting communications with a telematics server, or operate as a mobile communication terminal, such as a portable phone. Such mobile communication terminals are mainly equipped with mobile display devices. For example, as high-quality hardware is being incorporated into portable phones, a universal serial bus capable of transmitting mass storage data is provided in the portable phones. Various telematics terminals used in relation to such portable phones have been developed.

Conventional telematics terminals cannot transmit mass storage data to portable terminals, so the conventional telematics terminals only provide a turn-by-turn navigation function to the portable terminals. For instance, as shown in FIG. 1, the conventional telematics terminals may display the direction a vehicle is currently moving in by using an arrow embodied as an icon.

The conventional telematics terminals use display devices of the portable terminals, such as liquid crystal displays, since the conventional telematics terminals do not have their own display devices. The conventional telematics terminals transmit route guide data to the portable terminals by using a universal asynchronous receiver/transmitter (UART) while simultaneously performing a hands-free function, so the conventional telematics terminals cannot transmit mass storage data to the portable terminals. The conventional telematics terminals only provide the turn-by-turn navigation function to the portable terminals to direct the route of the vehicle.

According to the turn-by-turn navigation function, the direction of the vehicle is represented with an arrow, a text or a sound. Thus, a telematics terminal utilizing the turn-by-turn navigation function is very useful if the vehicle runs along a grid-type road, in which a driver can precisely recognize the direction of the vehicle and current turn information, such as "right turn", "left turn," "go straight", and "U-turn". However, if route guide information is provided to the driver using only the turn-by-turn navigation function in complex roads, such as five-way cross roads or high-level roads, or on curved roads, the driver cannot precisely recognize the direction of the current turn information of the vehicle. For example, if the route guidance is carried out by using the turn-by-turn navigation function in the vicinity of Seoul City Hall, lamp-ways for an express highway, or in continuous intersections, the driver can become confused.

In order to solve the above problems, there has been provided a method in which a telematics terminal displays map data by downloading the map data from an information center in a wireless manner. However, such a method requires a continuously wireless data-communication link to the information center, thereby causing excessive data communication expenses.

SUMMARY OF THE INVENTION

Accordingly, the present invention has been made to solve the above-mentioned and other problems occurring in the prior art, and a first object of the present invention is to provide a telematics system and a method for directing a route by using the same, capable of allowing users to precisely recognize the route without increasing communication expenses.

A second object of the present invention is to provide a telematics system and a method for directing a route by using the same, capable of providing users with an intersection route by using intersection image information stored in advance in the telematics system.

To accomplish the above objects, there is provided a telematics system comprising: a telematics terminal having complex intersection images stored therein in advance to provide information relating to a present position and a direction of a moving object by using the complex intersection images; and a telematics server, which shares ID codes of the complex intersection images stored in the telematics terminal with the telematics terminal and creates route data in response to a request by the telematics terminal, wherein the telematics server adds the ID codes of the complex intersection images to the route data when the route data include complex intersections and transmits the ID codes of the complex intersection images.

According to another aspect of the present invention, there is provided a method for directing a route in telematics system by using image data, the method comprising the steps of: creating route data in a telematics server in response to a route guidance request of a user; transmitting ID codes of complex intersections through the telematics server by adding the ID codes of the complex intersections to the route data when the route data includes complex intersections; determining if the ID codes of complex intersections are included in the route data by using a telematics terminal; and providing a route guidance service by extracting complex intersection image data corresponding to the ID codes of the intersections from complex intersection data stored in the telematics terminal when the route data includes the ID codes of the complex intersections.

BRIEF DESCRIPTION OF THE DRAWINGS

The above objects and other features and advantages of the present invention will be more apparent from the following detailed description taken in conjunction with the accompanying drawings, in which:

FIG. 4 is a diagram illustrating an example of image data stored in a telematics terminal according to one embodiment of the present invention;

DETAILED DESCRIPTION OF THE PREFERRED EMBODIMENT

Figure 1:
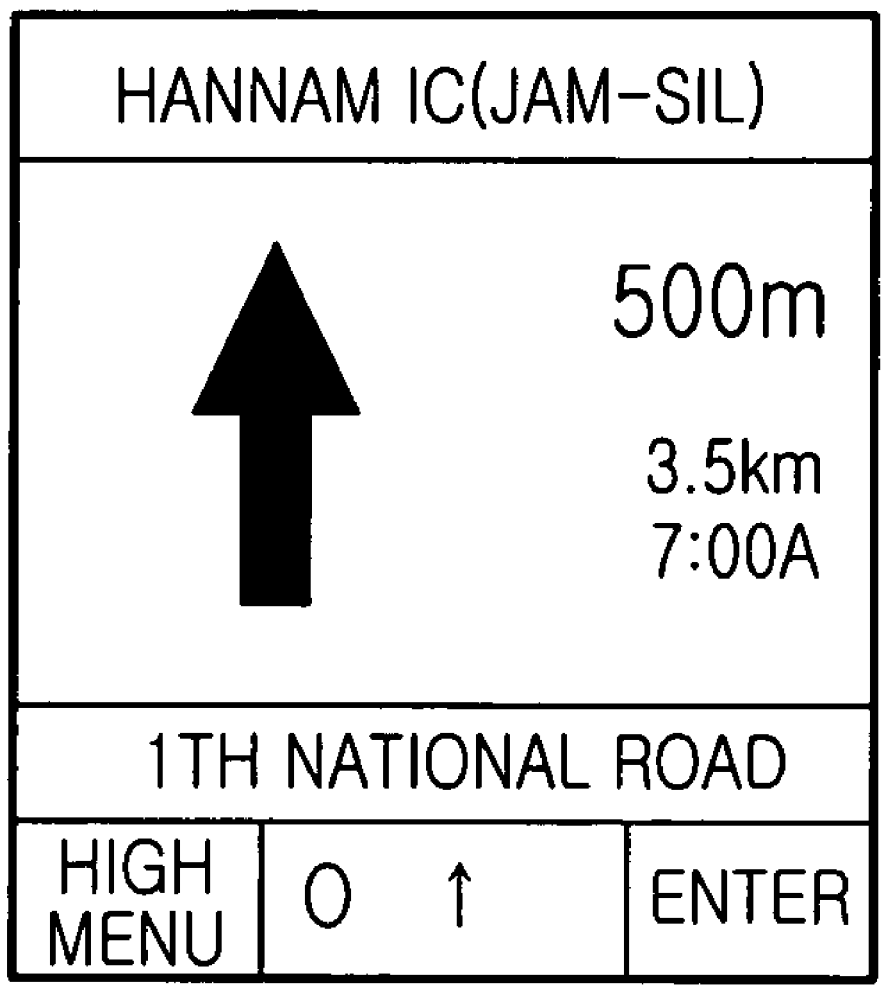
FIG. 1 is a diagram illustrating an example of an intersection guiding method in a conventional telematics system.

Hereinafter, a preferred embodiment of the present invention will be described with reference to the accompanying drawings. In the following description of the present invention, the same reference numerals are used to designate the same or similar components and a detailed description of known functions and configurations incorporated herein will be omitted when it may make the subject matter of the present invention rather unclear.

Figure 2:
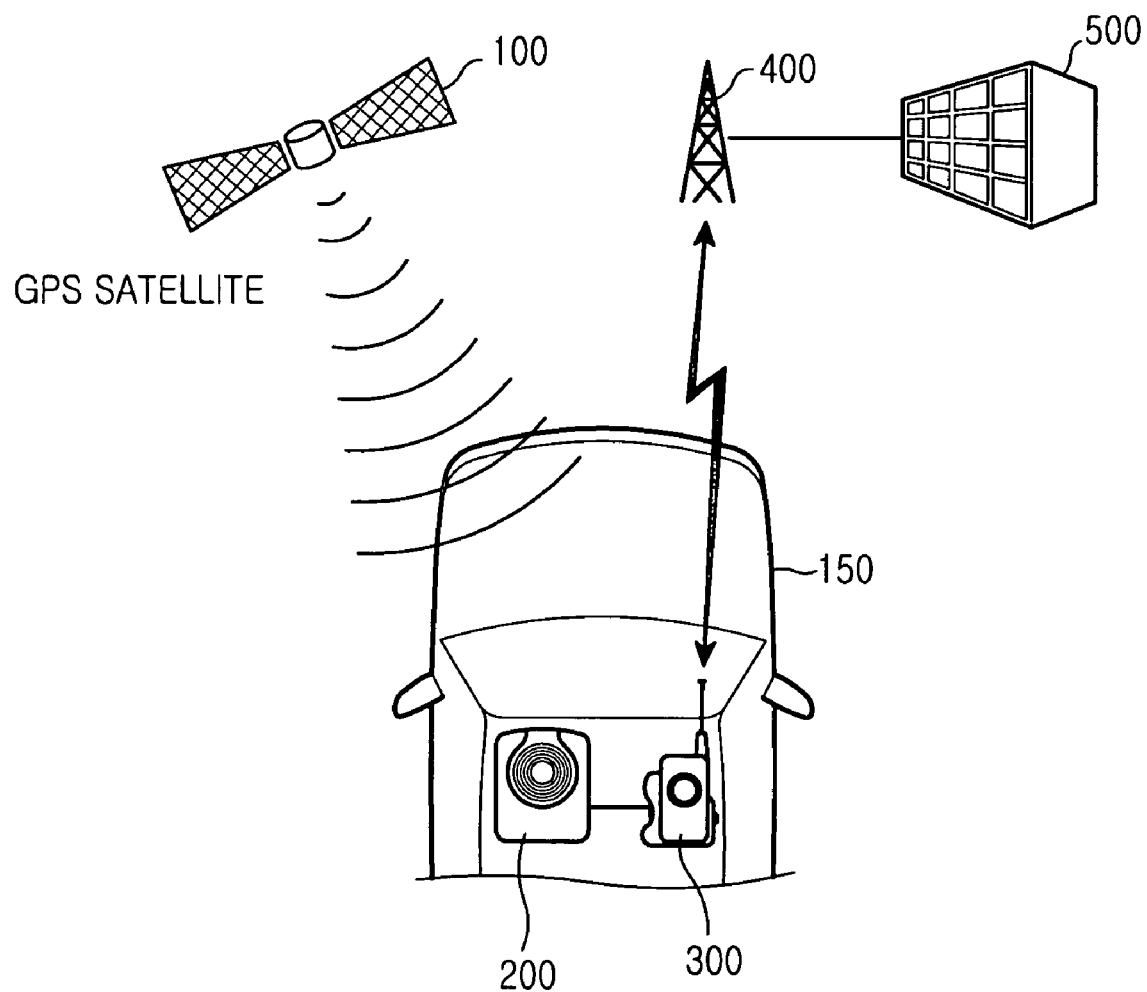
FIG. 2 is a diagram illustrating a structure of a telematics system.

FIG. 2 is a diagram illustrating a structure of a telematics system. Referring to FIG. 2, the telematics system includes a GPS satellite 100, a mobile communication terminal 300, referred to as a "portable terminal", communicating with an information center 500 through a wireless network 400, and a telematics terminal 200, referred to as a "telematics kit", communicating with both GPS satellite 100 and portable terminal 300, to provide a driver of vehicle 150 with current position information and traveling information of vehicle 150. The information center 500 is connected to the wireless network 400 so as to provide various route guide information to the telematics terminal 200. In FIG. 2, the telematics terminal 200 and the portable terminal 300 are shown installed in the vehicle 150.

The telematics terminal 200 receives position information of the vehicle 150 from the GPS satellite 100. Upon receiving position information of the vehicle 150, the telematics terminal 200 analyzes the position of the vehicle 150 and transmits position information of the vehicle 150 to the portable terminal 300 so as to provide a driver with traveling information corresponding to the present position of the vehicle 150. In addition, the telematics terminal 200 directs a traveling route of the vehicle 150 in response to a request from the driver. To this end, the telematics terminal 200 may include an interface device, such as a display device and a speaker. The interface device may be provided in the telematics terminal 200, or an external interface device can be interfaced with the telematics terminal 200. In FIG. 2, the telematics terminal 200 uses a display device (not shown) and a speaker (not shown) of the portable terminal 300 as an external interface device thereof. That is, if the driver requests present position information and optimal route information to a destination through the portable terminal 300, the telematics terminal 200 provides corresponding information to the driver through the display device and the speaker of the portable terminal 300.

In addition, the telematics terminal 200 stores is an internal memory (not shown) complex intersection image information to be accessed when directing the traveling route. Such complex intersection image information can include common complex intersection images and special complex intersection images, which are separately stored in the telematics terminal 200. The common complex intersection images represent complex intersections, which are similar to each other and exist in various spots of the country, by generalizing the complex intersections. In addition, the special complex intersection images represent complex intersections located in complex regions which can the driver to confusion. Since it is difficult to represent the special complex intersections by using general images, the special complex intersections are depicted in detail similar to real pictures thereof. According to the present invention, image information with respect to the complex intersections is prepared in advance. In addition, such image information and ID codes thereof are stored in the telematics terminal 200. When the vehicle enters into the complex intersection, the telematics terminal 200 displays image information corresponding to the complex intersection.

The information center 500 acts as a server for providing the driver with telematics services. The information center 500 may include various types of digital map databases for calculating a route when the telematics terminal 200 requests route guide information. The digital map includes map data for calculating the route and special information for each intersection to be provided to the driver. For instance, such special information of each intersection may include a route guide digital map data including an intersection, such as four corners or a five-way intersection, a name of the intersection, and building information around the intersection. Also, such special information may include facility information digital map data including names and POI (point of interest) data of various facilities. The route guide digital map data includes ID codes corresponding to the ID codes of the complex intersection images stored in the telematics terminal 200.

Figure 3:
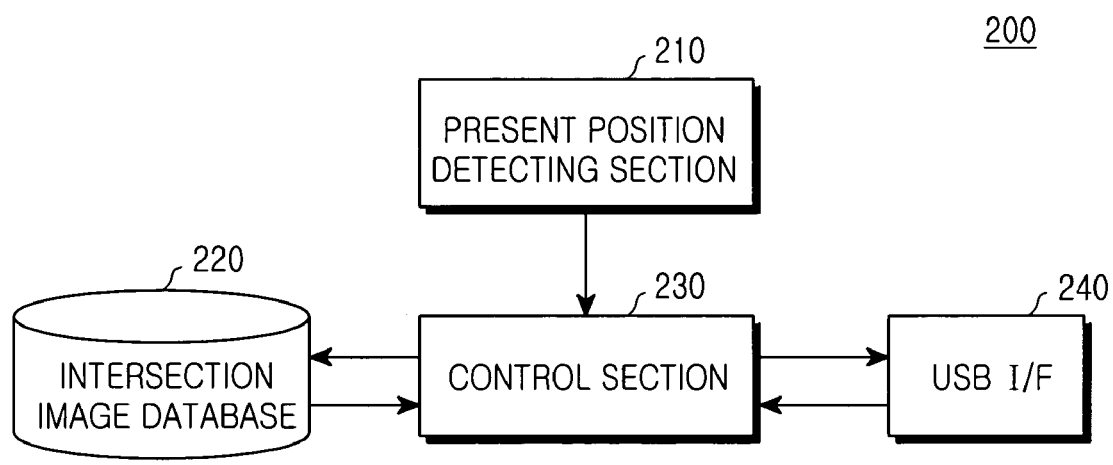
FIG. 3 is a block diagram illustrating a structure of a telematics terminal according to one embodiment of the present invention.

FIG. 3 is a block diagram illustrating the structure of the telematics terminal 200 according to one embodiment of the present invention. Referring to FIG. 3, the telematics terminal 200 includes a present position detecting section 210, an intersection image database 220, a control section 230 and a USB I/F (universal serial bus interface) section 240.

The present position detecting section 210 detects a present position of the vehicle equipped with the telematics terminal 200. For instance, the present position detecting section 210 analyzes a GPS signal transmitted from the GPS satellite 100 (referred to in FIG. 2) and calculates a coordinate value corresponding to the present position of the vehicle 150.

The intersection image database 220 stores image information, which has been prepared in advance. Intersection image information is image data, which has been created in advance with respect to intersections located in a service area. Particularly, the intersection image database 220 stores intersection image information by classifying intersection image information into complex intersection images and general intersection images. The intersection image database 220 again classifies the complex intersection images into common complex intersection images and special complex intersection images. The complex intersection images include image information, which has been created in advance with respect to the intersections, such as five-way intersections, selected as complex intersections based on a predetermined basis. In addition, the general intersection images include image information, which has been created in advance with respect to intersections, which have not been selected as the complex intersections. The common complex intersection images and special complex intersection images have been described with reference to the telematics terminal 200 shown in FIG. 2. The intersection image database 220 stores the common complex intersection images representing complex intersections, which are similar to each other and exist at various locations of the country, for example "U-turn at a road below an overpass", by generalizing the complex intersections according to types. The intersection image database 220 also stores the special complex intersection images representing complex intersections located in complex regions which can lead the driver to confusion. Since it is difficult to represent the special complex intersections by using general images, the special complex intersections are depicted in detail similar to real pictures thereof. The intersection image database 220 also stores the general intersection images. The general intersection images are determined by generalizing intersections that match predetermined characteristics of the intersections by analyzing route data transmitted from the information center.

By storing the intersection images in the intersection image database 220 classified into the complex intersection images and generation intersection images, and classifying the complex intersection images into the common intersection images and the special complex intersection images, the telematics terminal 200 can transmit various intersection images having mass storage data without lowering performance of the telematics terminal 200.

Complex intersection image data have their own ID codes for identifying each of the complex intersection image data and share the ID codes with an external server, such as an information center, in order to use the ID code when transmitting route guidance information to the users from the information center. Since the external server (information center) shares the ID codes of the complex intersection images with the telematics terminal 200, if the complex intersection images are included in the route requested by the user, the external server may transmit route data including image information (for example, intersection image ID codes) corresponding to the complex intersection images. Upon receiving the route data, the telematics terminal 200 extracts the corresponding images from the intersection image database 220 based on the image information (intersection image ID codes) and displays the images.

Figure 5A:
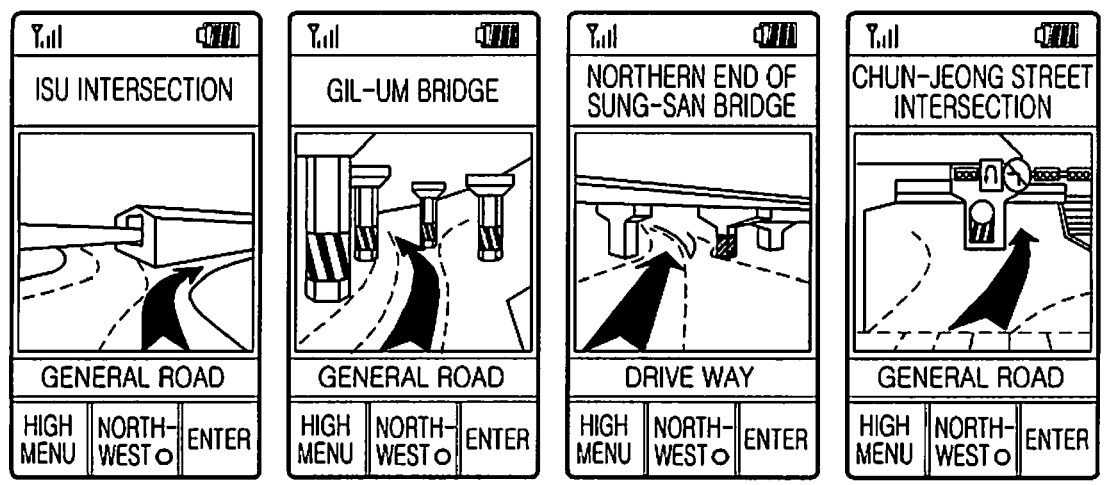
FIGS. 5A and 5B are diagrams illustrating screen images for providing a guidance regarding a route by using image data according to one embodiment of the present invention.
Figure 5B:
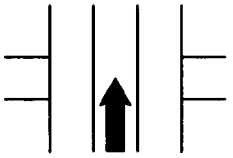
Figure 5B:
Figure 5B:
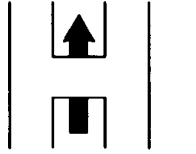
Figure 5B:
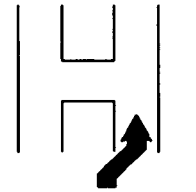
Figure 5B:
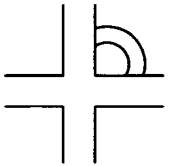
Figure 5B:
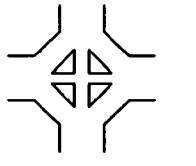

Examples of the image data stored in the intersection image database 220 are shown in FIGS. 4, 5A, and 5B. Such image data stored in the intersection image database 220 will be described in detail with reference to FIGS. 4, 5A and 5B.

Returning again to FIG. 3, the control section 230 receives present position information from the present position detecting section 210 and converts route data transmitted from the external server (for example, a telematics server) in response to the user's request in such a manner that the user can utilize the route data. Then, the control section 230 transmits the converted route data to the USB I/F section 240. The telematics terminal 200 must be equipped with a wireless device (not shown) for communicating with the external server.

Upon receiving the route data, the control section 230 analyzes the route data and determines if the user has requested route information. If route information has been requested, the control section 230 determines if complex intersection image information (for example, intersection image ID code) is included in the route data. If complex intersection image information is included in the route data, the control section extracts the complex intersection image data, corresponding to intersection image information, from the intersection image database 220, and transmits the complex intersection image data to the USB I/F section 240 together with the route data. The control section 230 searches the intersection image database 220 by using the image ID codes included in the route data, and extracts corresponding common complex intersection images or special complex intersection images. If the route data have no complex intersection image information, common intersection images for basic turn-by-turn route guidance are extracted by using linear information of the route data.

The USB I/F section 240 is a device for interfacing between the telematics terminal 200 and the portable terminal 300 (referred to in FIG. 1). The route data transmitted to the portable terminal 300 from the information center would be sent to the telematics terminal 200 through the USB I/F section 240. Since the USB I/F section 240 can transmit mass storage data, the USB I/F section 240 is adaptable for transmitting the complex intersection images of the telematics terminal 200 to the portable terminal 300.

The image data stored in the intersection image database 220 will now be described in detail with reference to FIGS. 4, 5A and 5B.

FIG. 4 is a diagram illustrating an example of image data stored in a telematics terminal according to an embodiment of the present invention, and FIGS. 5A and 5B are diagram illustrating screen images for directing a route by using the image data according to an embodiment of the present invention.

Referring to FIG. 4, complex intersection image data stored in the telematics system according to an embodiment of the present invention includes an IMAGE showing an image of a road, a STRING showing a name of a corresponding intersection, a NUMBER including a distance between a present position and an intersection, a distance between a present position and a destination, and an arrival time to a destination, a Code displaying a running direction of a vehicle and a receive sensitivity of GPS signals, and a transmission position of complex intersection image data. The complex intersection images may be formed as special complex intersection images representing special intersections as shown in FIG. 5A, or as common complex intersection images, which can be commonly used for representing intersections having linear patterns similar to each other, as shown in FIG. 5B. In addition, it is also possible to fabricate and store image data with respect to both special complex intersection images and common complex intersection images in such a manner that the special complex intersection image or common complex intersection image can be selectively displayed according to the ID codes included in the route data. As shown in FIGS. 5A and 5B, the complex intersection images may include an arrow for representing the running direction of the vehicle, and if so the complex intersection image should have dedicated ID codes and images corresponding to each direction.

According to the present invention, a driver can easily recognize the running direction of the vehicle to the destination even if the driver drives the vehicle in a complex region which can lead the user to confusion. For example, if the driver must rapidly turn the vehicle to the right after turning the vehicle to the left in order to enter into a predetermined intersection, the present invention provides the driver with images representing the pattern of the road so that the driver can drive the vehicle by predicting the running direction of the vehicle. If the complex intersection image is not provided to the driver, that is, in systems where only the general intersection image is only provided to the driver, the driver may be plunged into confusion because right turn information is provided to the driver after the driver has turned the vehicle to the left. The present invention prevents such a situation by providing the driver with the road pattern in advance. Preferably, the telematics terminal stores such intersection image database in a flash memory together with a display map data.

Figure 6:
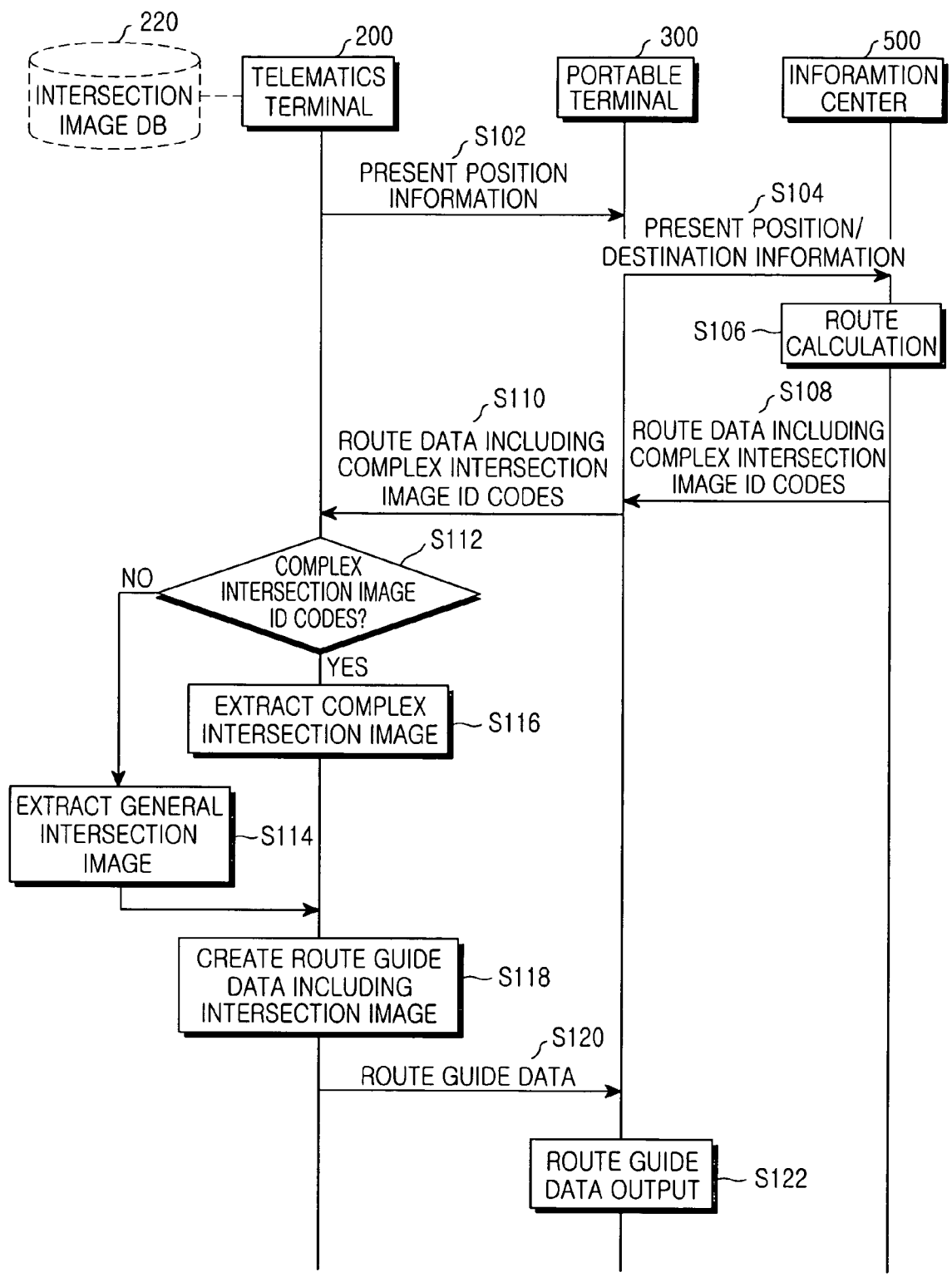
FIG. 6 is a flowchart of a method for providing guidance regarding a route according to one embodiment of the present invention.

FIG. 6 is a flowchart illustrating a method for directing a route according to an embodiment of the present invention. Referring to FIG. 6, when a user requests a route to a destination, the telematics terminal 200 transmits present position information to the portable terminal 300 (S102). Upon receiving present position information, the portable terminal 300 sends present position information to the information center 500 together with destination information inputted by the user (S104). The present position information may be detected by the telematics terminal 200 as shown in FIG. 6 or input into the portable terminal 300 by the user. As present position information and destination information are transmitted to the information center 500, the information center 500 calculates an optimal route by using present position information and destination information (S106), and creates route data called "route guidance information" and transmits the route data to the telematics terminal 200 through the portable terminal 300 (S108 and S110).

If a complex intersection is included in the optimal route calculated in step S106, the information center 500 transmits route data while adding intersection ID codes corresponding to the complex intersection to the route data. After creating the route data, the information center 500 searches intersection ID codes if a node point corresponding to the complex intersection is included in the route data and adds the intersection ID code corresponding to the complex intersection to the route data. The information center 500 selects the ID codes of the corresponding intersection while taking into consideration the running direction of the vehicle 150 at the intersection, and adds the ID code to the route data to be transferred to the user. That is, since images of the intersection varies depending on the running directions of the vehicle 150 entered into the intersection, the information center 500 selects the ID code representing the image of the complex intersection corresponding to the running directions of the vehicle 150, and transfers the route data to the user by adding the ID code to the route data.

The telematics terminal 200 receives the route data and provides the route to the user based on the route data. That is, when the user nears the intersection where the route guide must be provided to the user, the telematics terminal 200 determines if the complex intersection image ID code is included in the route data in order to determine if the intersection is a complex intersection (S112). If the route data include the complex intersection image ID code, the intersection is determined as a complex intersection and the complex intersection image corresponding to the complex intersection image ID code is extracted from the intersection image database 220 (S116). If the route data do not include the complex intersection image ID code, it is determined that the intersection is a general intersection. In this case, the telematics terminal 200 extracts general intersection image from the intersection image database 220 by using linear information included in the route data (S114). For instance, an arrow icon image used for the conventional turn-by-turn navigation function is extracted.

In addition, the telematics terminal 200 creates route guide data including the intersection image (S118) and transmitted the route guide data to the portable terminal (S120). Preferably, the telematics terminal 200 transmits route guide data including complex intersection images by using a USB connection. This is because the complex intersection image, which is depicted in detail, has storage capacity greater than storage capacity of the general intersection image. That is, the USB I/F section 240 is required in order to rapidly transmit mass storage data to the portable terminal 200.

Then, the portable terminal 300 outputs route guide data, which have been transmitted to the portable terminal 300 in step S120 (S122). For instance, the portable terminal 300 outputs image information by using a display section thereof and outputs audio information by using a speaker thereof.

As described above, according to the present invention, intersection route data are provided to the user by using intersection image information, which is preset in the telematics system, so the user may easily recognize intersections and routes without causing excessive data communication expenses.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A telematics system, comprising:
   a telematics terminal for providing information related to a present position and a running direction by using complex intersection images; and
   a telematics server for storing complex intersection image information and creating route data in response to a request from the telematics terminal,
   wherein the telematics server adds image information corresponding to a complex intersection to the route data when the route data includes the complex intersection, and transmits the route data including the complex intersection image information to the telematics terminal, and
   wherein the telematics terminal extracts a complex intersection image corresponding to the complex intersection image information included in the route data.

2. The telematics system as claimed in claim 1, wherein the telematics terminal comprises:
   an interface section for interfacing with an external terminal; and
   a control section for transmitting the complex intersection image to the interface section by extracting the complex intersection image corresponding to the complex intersection image information, when the route data transmitted from the telematics server includes the complex intersection image information.

3. The telematics system as claimed in claim 2, wherein the telematics terminal further comprises a memory for storing the complex intersection image information.

4. The telematics system as claimed in claim 3, wherein the memory stores an Identification (ID) code for identifying a complex intersection image.

5. The telematics system as claimed in claim 3, wherein the memory stores a predetermined ID code and the complex intersection image of the complex intersection with route guidance directions for the complex intersection.

6. The telematics system as claimed in claim 3, wherein the memory stores predetermined intersection images of complex intersections selected from intersections included in a service region based on a predetermined basis.

7. The telematics system as claimed in claim 3, wherein the memory stores special complex intersection image information including intersection images for intersections that are predetermined as complex.

8. The telematics system as claimed in claim 3, wherein the memory stores common intersection image information including intersection images for intersections that are predetermined as common and commonly used in similar intersections.

9. The telematics system as claimed in claim 3, wherein the memory stores map data together with the complex intersection image information.

10. The telematics system as claimed in claim 3, wherein the memory comprises a flash memory.

11. The telematics system as claimed in claim 3, wherein the interface section comprises a universal serial bus interface.

12. The telematics system as claimed in claim 1, wherein the telematics server comprises map data for calculating a route and special information of intersections requiring a route guidance, the special information of the intersections including route guidance digital map data that contains an intersection, a name of the intersection, and building information around the intersection, facility information digital map data that contains names and POI (point of interest) data of facilities around the intersection and information corresponding to ID codes of the complex intersection images.

13. A telematics system, comprising:
  a telematics terminal for storing complex intersection images and providing information related to a present position and a running direction by using the complex intersection images; and
  a telematics server for storing complex intersection image information corresponding to the complex intersection images stored in the telematics terminal and creating route data in response to a request from the telematics terminal,
  wherein the telematics server adds the corresponding complex intersection image information to the route data when the route data includes at least one of the complex intersections, and transmits the route data including the complex intersection image information to the telematics terminal, and
  wherein the telematics terminal extracts complex intersection images from the stored complex intersection images corresponding to the complex intersection image information included in the route data.

14. A method for directing a route in telematics system including a telematics server and a telematics terminal, the method comprising:
  creating route data in the telematics server in response to a route guide request of a user;
  transmitting, to the telematics terminal, the route data including complex intersection image information, when the route data includes a complex intersection;
  determining, by the telematics terminal, if the complex intersection image information is included in the route data;
  extracting a complex intersection image from a memory corresponding to the determined complex intersection image information; and
  providing a route guidance service including the complex intersection image, when the route data includes the complex intersection image data.

15. The telematics method as claimed in claim 14, wherein route guidance service including the complex intersection image are output through a communication terminal.

16. The telematics method as claimed in claim 14, wherein the complex intersection image is transmitted to an external communication terminal through a universal serial bus.

* * * * *

UNITED STATES PATENT AND TRADEMARK OFFICE
CERTIFICATE OF CORRECTION

PATENT NO. : 7,650,235 B2  Page 1 of 1
APPLICATION NO. : 10/933764
DATED : January 19, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1071 days.

Signed and Sealed this

Twenty-third Day of November, 2010

David J. Kappos
*Director of the United States Patent and Trademark Office*